United States Patent
Chou et al.

(10) Patent No.: US 10,045,276 B2
(45) Date of Patent: Aug. 7, 2018

(54) DATA-DRIVEN NETWORK PATH SELECTION

(71) Applicant: Microsoft Technology Licensing, LLC, Redmond, WA (US)

(72) Inventors: Philip Andrew Chou, Bellevue, WA (US); Venkata N. Padmanabhan, Bengaluru (IN); Rajdeep Das, Bangalore (IN); Ganesh Ananthanarayanan, Bellevue, WA (US); Junchen Jiang, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 15/169,429

(22) Filed: May 31, 2016

(65) Prior Publication Data

US 2017/0347308 A1 Nov. 30, 2017

(51) Int. Cl.
*H04W 40/18* (2009.01)
*H04W 24/10* (2009.01)
(Continued)

(52) U.S. Cl.
CPC ............ *H04W 40/18* (2013.01); *H04L 43/08* (2013.01); *H04L 45/12* (2013.01); *H04L 45/70* (2013.01);
(Continued)

(58) Field of Classification Search
CPC .. H04W 40/18; H04W 28/0231; H04W 24/10
See application file for complete search history.

(56) References Cited

U.S. PATENT DOCUMENTS 6,665,271 B1 12/2003 Thomas et al.
6,973,622 B1 12/2005 Rappaport et al.
(Continued)

FOREIGN PATENT DOCUMENTS

CN 102035586 A 4/2011
WO 2016049312 A1 3/2016

OTHER PUBLICATIONS

"International Search Report and Written Opinion Issued in PCT Application No. PCT/US2017/033435", dated Jul. 27, 2017, 15 Pages.
(Continued)

*Primary Examiner* — Andrew Lai
*Assistant Examiner* — Harry H Kim
(74) *Attorney, Agent, or Firm* — Schwegman Lundberg & Woessner, P.A.

(57) ABSTRACT

Techniques for determining network paths for voice calls include analyzing network path measurements of the network paths to determine historical network performance data for the network paths, and identifying a group of top-k network paths based on those network paths having better network performance data other network paths. A particular network path may be selected using various techniques, such as selecting the network path with the best historical network performance, selecting a network path by applying a multi-armed bandit algorithm to select the path from the group of top-k network paths, or selecting a network path at random. The selected network path may be used to by a source-destination pair of computing devices for a voice call, and a record of that voice call may be used to update network performance information for the particular network path.

17 Claims, 8 Drawing Sheets

(51) Int. Cl.
H04W 28/02 (2009.01)
H04L 12/26 (2006.01)
H04L 12/721 (2013.01)
H04L 12/717 (2013.01)

(52) U.S. Cl.
CPC ....... *H04W 24/10* (2013.01); *H04W 28/0231* (2013.01); *H04L 45/42* (2013.01)

(56) References Cited

U.S. PATENT DOCUMENTS

| | | | |
|---|---|---|---|
| 7,778,165 B2 | 8/2010 | Madhyastha et al. | |
| 2002/0165957 A1 | 11/2002 | Devoe et al. | |
| 2010/0121801 A1* | 5/2010 | Roy | G06N 7/005 706/46 |
| 2012/0321052 A1* | 12/2012 | Morrill | H04L 29/06027 379/32.01 |
| 2016/0191194 A1* | 6/2016 | Wood | H04J 14/0286 398/58 |
| 2016/0380892 A1* | 12/2016 | Mahadevan | H04L 45/02 370/389 |

OTHER PUBLICATIONS

Agapi et al., "Accurate Relay Selection for Improved Multipath Throughput in Internet Overlays," Retrieved on: Mar. 7, 2016, Available at «http://www.few.vu.nl/~kielmann/papers/imc.pdf» 9 pages.
Agarwal, et al., "Matchmaking for Online Games and Other Latency-sensitive P2P Systems," In Proceedings of the ACM SIGCOMM Conference on Data Communication, Aug. 17, 2009, pp. 315-326.
Andersen et al., "Resilient Overlay Networks," In Proceedings of the Eighteenth ACM Symposium on Operating Systems Principles, Oct. 21, 2001, pp. 131-145.
Auer et al., "Finite-Time Analysis of the Multiarmed Bandit Problem," In Journal of Machine Learning, vol. 47, Issue 2-3, May, 2002, pp. 235-256.
Banerjee et al., "Scalable Application Layer Multicast," In Proceedings of the Conference on Applications, Technologies, Architectures, and Protocols for Computer Communications, Aug. 19, 2002, pp. 205-217.
Baset et al., "Reliability and Relay Selection in Peer-to-Peer Communication Systems," In Proceedings of Fourth International Conference on Principles, Systems and Applications of IP Telecommunications, Aug. 2, 2010, 11 pages.
Bui, "Relay Path Selection for Peer-to-peer Voice-over-IP Systems," In Thesis of RMIT University, Aug. 2010, 158 pages.
Castro et al., "Network Tomography: Recent Developments," In Journal of Statistical Science, vol. 19, No. 3, Aug. 2004, pp. 499-517.
Chen et al., "Measuring the Perceptual Quality of Skype Sources," In Proceedings of the ACM SIGCOMM workshop on Measurements up the stack, Aug. 17, 2012, pp. 1-6.
Chen et al., "Modeling the QoE of Rate Changes in SKYPE/SILK VoIP Calls," In Proceedings of the 20th ACM international conference on Multimedia, Oct. 29, 2012, 10 pages.
Chen et al., "Quantifying Skype User Satisfaction," In Proceedings of the Conference on Applications, Technologies, Architectures, and Protocols for Computer Communications, Sep. 11, 2006, pp. 399-410.
Chesire et al., "Measurement and Analysis of a Streaming Media Workload," In Proceedings of the 3rd conference on USENIX Symposium on Internet Technologies and Systems, vol. 3, Mar. 26, 2001, 12 pages.
Cole et al., "Voice over IP Performance Monitoring," In Proceedings of ACM SIGCOMM Computer Communication Review, vol. 31, Issue 2, Apr. 2001, pp. 9-24.

Dabek et al., "Vivaldi: A Decentralized Network Coordinate System," In Proceedings of the Conference on Applications, Technologies, Architectures, and Protocols for Computer Communications, Aug. 30, 2004, 12 pages.
Dobrian et al., "Understanding the Impact of Video Quality on User Engagement," In Proceedings of the ACM SIGCOMM Conference, Aug. 15, 2011, 12 pages.
Erikson, "MBone: The Multicast Backbone," In Publication of Communications of the ACM, vol. 37, Issue 8, Aug. 1994, pp. 54-60.
Eugene et al., "Predicting Internet Network Distance with Coordinates-Based Approaches," In Proceedings of 21st Annual Joint Conference of the IEEE Computer and Communications Societies, Jun. 23, 2002, 10 pages.
Flushing et al., "Relay Node Placement for Performance Enhancement with Uncertain Demand: A Robust Optimization Approach," In Proceedings of 11th International Symposium on Modeling and Optimization in Mobile, Ad Hoc, and Wireless Networks, May 13, 2013, 8 pages.
Foley, "Microsoft: Skype Runs on Windows Azure; SkyDrive up Next," Published on: Dec. 16, 2013, Available at «http://www.zdnet.com/article/microsoft-skype-runs-on-windows-azure-skydrive-up-next/» 4 pages.
Francis et al., "IDMaps: A Global Internet Host Distance Estimation Service," In Journal IEEE/ACM Transactions on Networking, vol. 9, Issue 5, Oct. 2001, pp. 525-540.
"G.107: The E-model: A Computational Model for Use in Transmission Planning," Retrieved on: Mar. 17, 2016, Available at «https://www.itu.int/rec/T-REC-G.107-201506-I/en» ___ pages.
"G.114: One-Way Transmission Time," Retrieved on: Mar. 17, 2016, Available at:\ «https://www.itu.int/rec/T-REC-G.114/en» ___ pages.
Gara, "Skype's Incredible Rise, In One Imag," Published on: Jan. 15, 2014, Available at «http://blogs.wsj.com/corporate-intelligence/2014/01/15/skypes-incredible-rise-in-one-image/» 3 pages.
Haq et al., "Leveraging the Power of Cloud for Reliable Wide Area Communication," In Proceedings of the 14th ACM Workshop on Hot Topics in Networks, Nov. 16, 2015, pp. 1-7.
Kateja et al., "DiversiFi: Robust Multi-Link Interactive Streaming," In Proceedings of 11th International Conference on emerging Networking EXperiments and Technologies, Dec. 1, 2015, 13 pages.
Kho et al., "Skype Relay Calls: Measurements and Experiments," In IEEE INFOCOM Workshops, Apr. 13, 2008, 6 pages.
Madhyastha, "An Information Plane for Internet Applications," In Dissertation of University of Washington, Aug. 2008, 147 pages.
Madhyastha et al., "iplane: An information plane for distributed services," In Proceedings of the 7th USENIX Symposium on Operating Systems Design and Implementation, Nov. 2006, pp. 367-380.
Padmanabhan et al., "The Content and Access Dynamics of a Busy Web Site: Findings and Implications," In Proceedings of the ACM SIGCOMM Conference on Applications, Technologies, Architectures, and Protocols for Computer Communication, Aug. 28, 2000.
Pendarakis et al., "ALMI: An application level multicast infrastructure," In Proceedings of the 3rd conference on USENIX Symposium on Internet Technologies and Systems—vol. 3, Mar. 26, 2001, 12 pages.
"Quality of Service for Voice over IP," Retrieved on: Mar. 17, 2016, Available at «http://www.cisco.com/c/en/us/td/docs/ios/solutions_docs/qos_solutions/QoSVoIP/QoSVoIP.pdf» 44 pages.
Ren et al., "ASAP: an AS-Aware Peer-Relay Protocol for High Quality VoIP," In Proceedings of 26th IEEE International Conference on Distributed Computing Systems, Jul. 4, 2006, 10 pages.
Saroiu et al., "An Analysis of Internet Content Delivery Systems," In Proceedings of the 5th symposium on Operating systems design and implementation, vol. 36, Issue SI, Dec. 31, 2002, pp. 315-327.
Savage et al., "The End-to-end Effects of Internet Path Selection," In Proceedings of the conference on Applications, technologies, architectures, and protocols for computer communication, Aug. 1999, pp. 289-299.
Schulzrinne et al., "RTP: A Transport Protocol for Real-Time Applications," Published on: Jul. 2003, Available at «https://tools.ietf.org/html/rfc3550» 89 pages.

(56) References Cited

OTHER PUBLICATIONS

Torres et al., "Dissecting Video Server Selection Strategies in the YouTube CDN," In Proceedings of the 2011 31st International Conference on Distributed Computing Systems, Jun. 20, 2011, pp. 248-257.

Wacek et al., "An Empirical Evaluation of Relay Selection in Tor," In Proceedings of 20th Annual Network & Distributed System Security Symposium, Feb. 24, 2013, pp. 1-17.

Wang et al. "An efficient relay node selection scheme to improve the performance of P2P-Based VoIP applications in Chinese interent," In Journal of Multimedia Tools and Applications, vol. 64, Issue 3, Jun. 2013, 27 pages.

Wendell,et al., "DONAR: Decentralized Server Selection for Cloud Services," In Proceedings of the ACM SIGCOMM conference, Aug. 30, 2010, pp. 231-242.

Xie et al., "A Measurement-based Study of the Skype Peer-to-Peer VoIP Performance," In 6th International workshop on Peer-To-Peer Systems, Feb. 26, 2007, 6 pages.

Xu et al., "Video Telephony for End-consumers: Measurement Study of Google+, iChat, and Skype," In Proceedings of ACM conference on Internet measurement conference, Nov. 14, 2012, pp. 371-384.

\* cited by examiner

DATA-DRIVEN NETWORK PATH SELECTION

BACKGROUND

As the Internet continues to improve connectivity between people located in geographically disparate locations, voice calls and multimedia sessions are increasingly being communicated using the public Internet rather than traditional telephone line networks. Currently, voice call service providers utilize Voice over Internet Protocol (VoIP) technologies to deliver voice calls over wide-area networks, such as the public Internet. While VoIP technologies provide for improved availability of voice calls for users of these voice call service providers, poor network performance within wide-area networks often results in poor call quality for voice calls made over these wide-area networks.

SUMMARY

This disclosure describes techniques for routing Internet voice calls through managed overlay architectures consisting of relays hosted at geographically distributed datacenters. The techniques described herein predict call quality for Internet voice calls based on the network performance associated with obtained network path measurements for various network paths through either the managed overlay structures or the wide-area networks. In some examples, the network path measurements may comprise measurements obtained by analyzing previously made Internet voice calls using the various network paths. Additionally, or alternatively, the network path measurements may be obtained through explicit, active measurements. For example, the network paths may be actively probed to determine network performance of the network paths rather than actually using the network paths for voice calls. The techniques described herein include analyzing the network path measurements for the various network paths through one or more networks to determine network performance for the various network paths. The network performance may be determined based on one or more network performance factors or metrics, such as round-trip time (RTT), packet loss rate, or signal jitter (e.g., packet jitter, packet delay jitter, etc.). In some examples, the techniques further include expanding the coverage of the network performance determined for the various network paths by identifying portions of network paths with no network path measurements, such as call records of previously made voice calls. Using known network performance data for network paths where network path measurements, such as records of previously made voice calls, are available, combinations of partially overlapping network paths may be used to estimate the network performance for the portions of the network paths no with network path measurements. In this way, network performance for additional network paths may be determined or estimated to expand the coverage of network paths with network performance data.

The techniques further include predicting a group of top-k network path options based on the network performance for the network paths. For instance, a group of the top-k network paths (i.e., top 10, top 5, etc.) may be identified based on the network paths having historical network performance that is better than the network performance of other available network path options. In some examples, a network path may be selected for a voice call for a source-destination pair. For example, the top-k network paths may be analyzed and the network path with the best historical network performance may be selected for the call. In other examples, the top-k options may be explored using a multi-armed bandit algorithm. In this way, guided exploration of the network paths in the top-k options may be performed to obtain additional network performance data. In some examples, a network path outside of the top-k options may be selected at random to obtain network performance data for network paths outside of the top-k options. In this way, network paths may be selected for voice calls, and network performance data for the various network paths may be collected and used to update the historical network performance for the network paths. Additionally, because network performance for network paths changes dynamically, network paths that historically may not have performed well may have improved their network performance. Thus, due to the dynamic nature of network performance, random exploration may identify network paths that historically have had poor network performance, but that now have improved network performance and are viable options for performing voice calls.

The techniques described herein affect the quality of Internet Voice calls made by computing devices in various ways. By identifying network performance for network paths using call records of previously made voice calls and/or actively obtained measurements, the network paths with the best network performance for a particular source-destination pair of computing devices may be identified and utilized for a voice call. In this way, the techniques described herein may improve the quality of Internet voice calls made. Accordingly, the techniques described herein can provide more efficient communication of voice calls over networks, less data lost in voice call transmissions, and improved signal quality of Internet voice calls.

This Summary is provided to introduce a selection of techniques in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
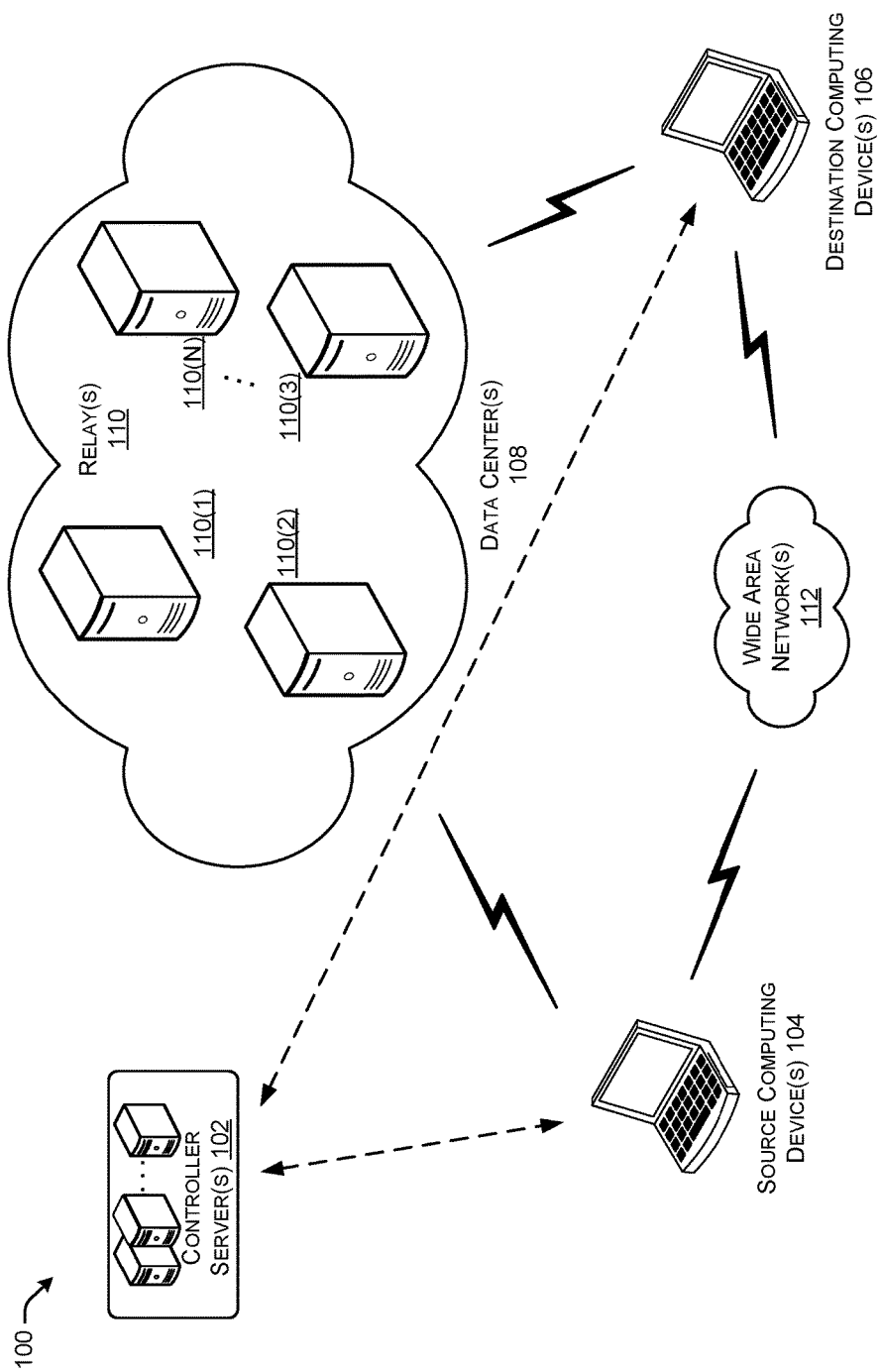
FIG. 1 is a schematic diagram showing an example environment for communicating Internet voice calls between a source computing device and a destination computing device.

This disclosure describes techniques for data-driven selection of network paths for communicating Internet voice calls. Network path measurements, such as call records of previous voice calls made by users of voice call service providers (e.g., SKYPE®, GOOGLE HANGOUTS®, WHATSAPP®, etc.), may be analyzed to determine network performance data for network paths. In some examples, the techniques described herein include selecting a network path for a voice call based at least in part on the network performance data of the network paths identified from the network path measurements. Once the network path has been selected, an indication of the network path may be output to a source computing device that desires to make an Internet voice call. The network paths may comprise data communication paths through one or more networks. For instance, the network paths may include a direct path between a source computing device and a destination computing device using wide-area networks, as well as relayed paths through one or more relays placed at one or more geographically distributed datacenters. The relayed paths may include one or more relays for routing voice calls between a source computing device and a destination computing device. In some examples, the relays placed at the geographically distributed datacenters may comprise the "backbone" of privately owned datacenters that provide a readily available infrastructure for a managed overlay network, such as datacenters run by MICROSOFT®, GOOGLE®, and AMAZON®.

In various examples, a controller server may receive a request, from a source computing device, to route a call from the source computing device to a destination computing device. The controller server may be, for example, a cloud-based controller that includes one or more modules for analyzing network path measurements to determine network performance data for network paths, and for identifying network paths over which to transmit the call based on the historical network measurement data. In some examples, all, or portions of, the one or more modules may additionally or alternatively be stored in at least one of the source computing device or the destination computing device. In some examples, source computing devices and/or destination computing devices may report to the controller server records of Internet voice calls that are made. The controller server may in turn store these call records.

In some examples, the controller server may analyze the network path measurements to determine network performance data for various network paths used to communicate Internet voice calls. The network path measurements may be analyzed, for example, based on one or more factors or metrics indicating network performance, such as the round trip time for the voice call, a rate at which data packets are lost with respect to time or a total amount of data, and/or a measure of jitter in a signal. Any one or more of these network performance metrics may be analyzed and determined for network path measurements. Any one or more of the network performance metrics may be combined in any manner (i.e., normalized and combined) to determine a total network performance for particular network paths. In some examples, one or more predefined thresholds may be determined or identified for one or more of the metrics, and/or for the total network performance.

Figure 5:
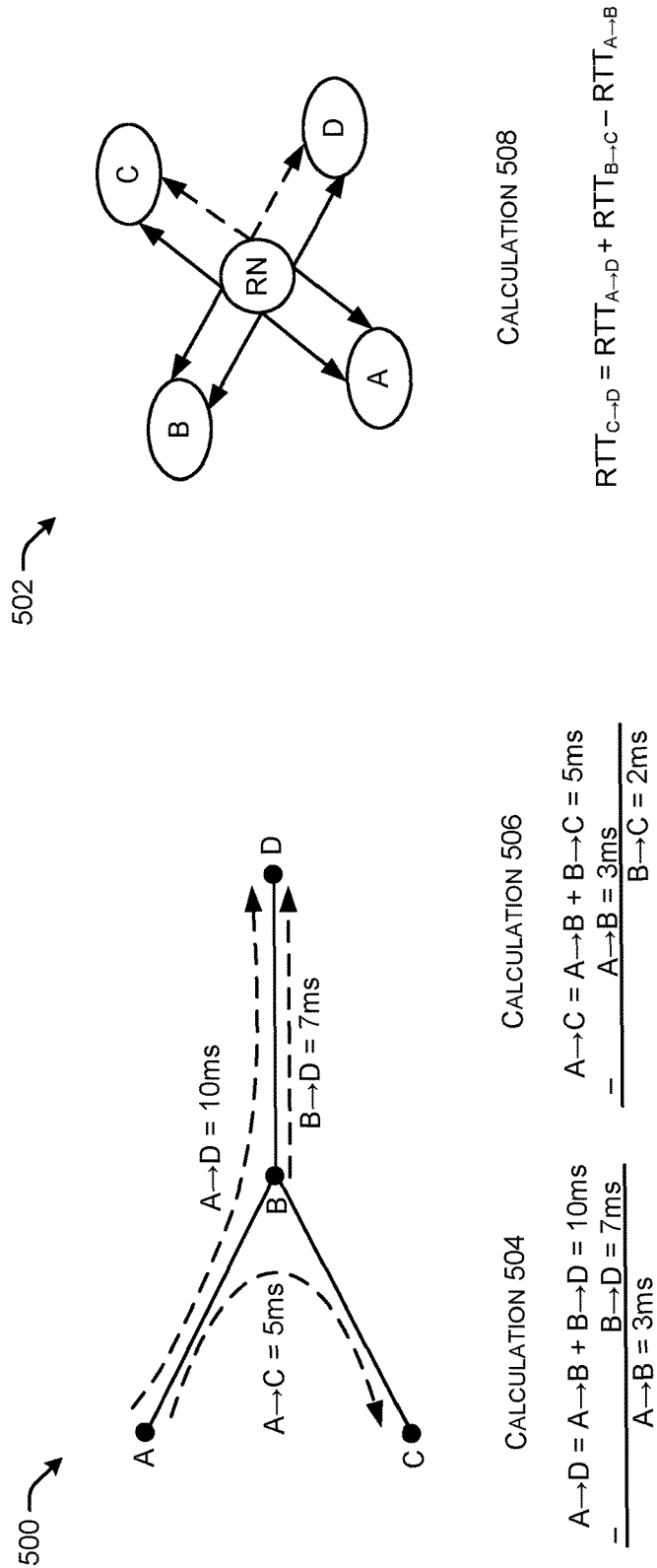
FIGS. 5A and 5B are schematic diagrams of example network path coverage expansion techniques for determining network performance data for network paths that do not have network path measurements.

In some examples, the controller server may employ network tomography to expand the coverage of known network performance data for a first plurality of network paths by determining or estimating network performance data for additional network paths. For example, the network path measurements may include information for previously made calls using a first plurality of network paths. However, there may be portions, or "holes," in the network for which call record information is missing. The controller server may include one or more modules configured to determine network tomography for networks between one or more source-destination pairs. For instance, the controller server may determine the internal characteristics of the one or more networks using information derived from end-point data contained in the network path measurements. Based on the end-to-end measurements between the source-destination pairs, internal characteristics of the one or more networks may be identified or estimated. For example, the internal characteristics of the one or more networks may be determined, such as by using traceroutes, such that the one or more networks may be modeled using any combination of one or more network models (e.g., star model, mesh model, etc.). Once the network has been suitably modeled, the additional network paths may be determined based on the network model or models and the network performance data for a first group of network paths. For example, as discussed in more detail with regard to FIG. 5, multiple network paths from the first group of paths that partially overlap may be used to determine network performance data for missing portions of a second group of network paths. In this way, network performance data for a second group of network paths, which includes the additional network paths and the first group of network paths, may be determined and expand the coverage and available options for relaying a call based on network performance data.

In various examples, the controller server may further include one or more modules for performing prediction-based pruning techniques to identify top-k options to use for communicating a call between a source-destination pair. Using the network performance data determined for the second group of network paths, the controller server may identify a group of the top options, or the options with the best historical network performance. The network performance data may be determined using one or more of the network performance factors, and the top-k options (i.e., top 5, top 10, etc.) may be identified based on the top-k options network performance data.

In various examples, the controller server may further include modules for selecting a network path for use by a source-destination pair. For instance, the controller server may simply identify the top network path from the top-k options and output an indication to the source computing device to use that particular network path. In some examples, the controller server may include a multi-armed bandit algorithm and apply the multi-armed bandit algorithm to the top-k options. The network paths included in the top-k options may each be considered an "arm" of the bandit where the network performance obtained is the reward. The multi-armed bandit algorithm may greedily explore the options in the top-k group and exploit the best decision based on various factors, such as the confidence in the measurements used for determining the network performance of the network paths, the particular time of day, or any other factors. In some examples, the controller server may select the network path at random from the network paths outside of the top-k options. By selecting a random network path outside of the top-k options, additional data for network paths that may not otherwise be explored is obtained and the network path performance data is updated.

The controller server may output an indication of the selected network path to one or more of a source computing device and/or a destination computing device. Once the source-destination pair has conducted a voice call using the selected network path, a record of the call may be sent to the controller server. The controller server may add the received call record to the historical call records used to determine the network performance data for the network paths. In this way, the network performance data for each network path may be continually updated as source-destination pairs use the network paths. This may provide for more accurate network performance determination as network performance may change over time.

While the techniques described herein are described with reference to voice calls, in some examples the techniques can be utilized for data-driven selection of network paths for other types of communication technologies. For example, online gaming service providers may identify network paths for their online gaming sessions using the techniques described herein to improve the performance of their online gaming. In another example, providers of text or email services may also use the techniques described herein for selecting network paths over which to communicate data.

Illustrative Environments

FIG. 1 is a schematic diagram showing an example environment 100 for communicating Internet voice calls between a source computing device and a destination computing device. More particularly, the example environment 100 may include one or more controller servers 102, one or more source computing devices 104, and one or more destination computing devices 106.

The controller server(s) 102 can be any entity, server, console, computer, etc., configured with one or more modules for analyzing network path measurements (i.e., previous call records, actively obtained measurements, etc.) to determine network performance data for network paths and selecting network paths based on the network performance data. In some examples, the controller server(s) 102 may be a cloud-based server accessible via the public Internet by source computing device(s) 104 and destination computing device(s) 106. In some examples the controller server(s) 102 may receive a request to communicate from the source computing device(s) 104 and/or the destination computing device(s) 106. The controller server(s) 102 may determine a network path through one or more networks over which the source-destination pair can communicate. The network paths may include a direct path (i.e., default path) through one or more wide area networks 112, such as the public Internet. The network paths may further include one or more relayed paths using one or more data centers 108 comprising one or more relays 110. In some examples, the data center(s) 108 may be globally distributed data centers, such as those run by AMAZON®, GOOGLE®, and MICROSOFT®. The relayed paths may include paths that route communications through one or more of the relay(s) 110 positioned at the data center(s) 108. For instance, the relayed paths may include a single relay 110 to "bounce" communications off of, or multiple relay(s) 110 enabling communications to "transit" through. In some examples, the relay(s) 110 may include a private backbone of a managed overlay network, such as Microsoft's AZURE® network.

In some examples, the controller server(s) 102 may receive a request, via a network such as the public Internet, from one or both of the source computing device(s) 104 and/or the destination computing device(s) 106. The request may include a request to make a voice call using one or more networks. The controller server(s) 102 may output an indication of a network path over which the source-destination pair can communicate. In some examples, the controller server(s) 102 may output a network path to a source-destination pair in response to each request received, while in other examples the controller server(s) 102 may periodically (e.g., every hour, every day, etc.) send out a list of network paths for the source computing device(s) 104 and destination computing device(s) 106 to use so the controller server(s) 102 don't need to respond to a request every time a source-destination pair requests to make a voice call.

In some examples, after the source-destination pair has completed a voice call using a particular network path, one of the source computing device(s) 104 or the destination computing device(s) 106 may send a call record of the call to the controller server(s) 102. The controller server(s) 102 may then include the call record with the other previously obtained call records to update network performance data for network paths over time. For example, the controller server(s) 102 may re-determine the network performance for the network paths continually or periodically using newly received call records. In this way, network performance data is updated in near-real time to dynamically determine network performance data for network paths over time. In various examples, old network performance data, or data that has been stored for over a threshold period of time, may be deleted.

Figure 2:
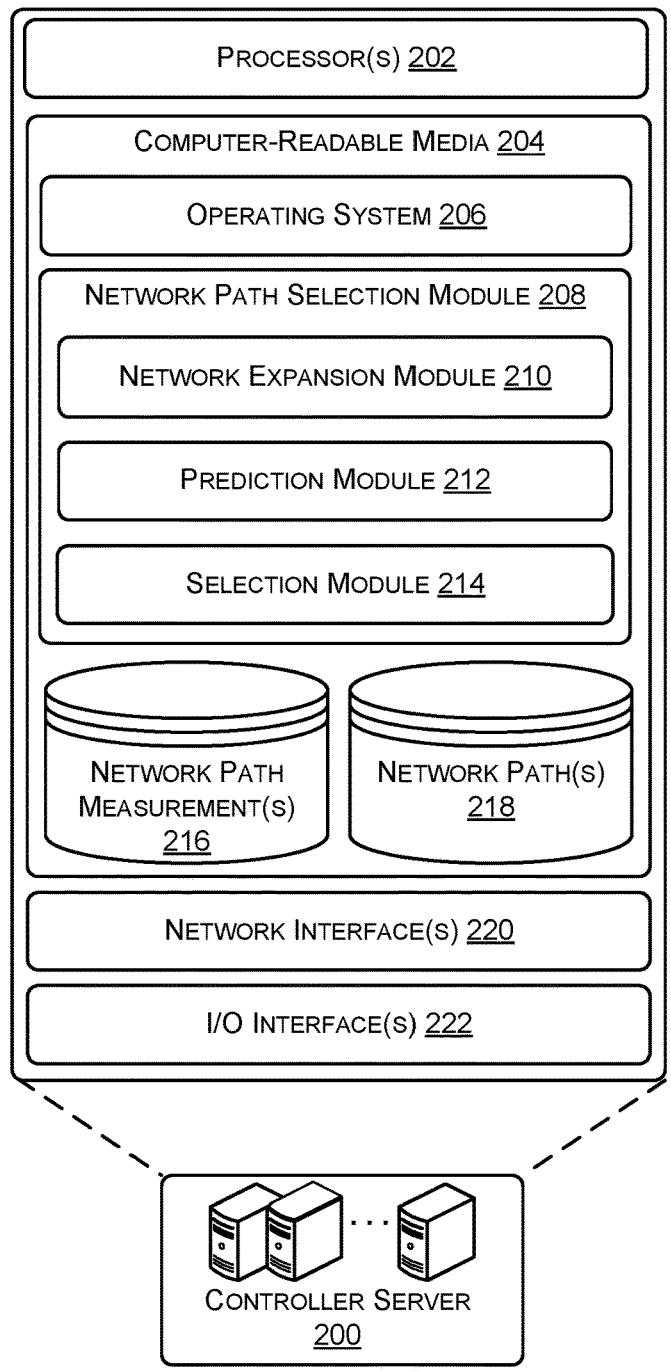
FIG. 2 is a schematic diagram showing an example controller server to perform various operations for data-driven network path selection for Internet voice calls.

FIG. 2 is a schematic diagram showing an example controller server 200 to perform various operations for data-driven network path selection for Internet voice calls. The controller server 200 may include any type of controller server, such as controller server(s) 102, configurable with one or more modules to analyze network path measurements and determine network paths for voice calls based on the network path measurements. Control server 200 may include one or more processors 202 coupled to computer-readable media 204, such as by a communication bus. The processor(s) 202 may include a central processing unit (CPU), graphics processing unit (GPU), a microprocessor, and so on.

Computer-readable media 204 may store an operating system 206 and a network path selection module 208. The operating system 206 may include computer-readable instructions that manage hardware and software resources of the controller server 200. The network path selection module 208 may include one or more modules for determining a network path usable by devices to communicate a voice call, such as a network expansion module 210, a prediction module 212, and a selection module 214.

The network expansion module 210 may include computer-readable instructions that, when executed by the processors(s) 202, perform various operations for expanding a set of available network paths for voice calls. For example, network expansion module 210 may analyze a plurality of network path measurements stored in the computer-readable media 204, such as in network path measurement(s) 216 data store. The network path measurement(s) 216 may include records of calls previously made by source-destination pairs of computing devices and/or actively obtained measurements, such as from network path probing. The network path measurements may indicate various network performance metrics, such as (i) round trip time (i.e., an amount of time for a signal to be sent from a source computing device to a destination computing device plus an amount of time for an acknowledgement of the signal to be received from the destination computing device), (ii) loss rate for data (i.e., an amount of data lost with respect to an amount of data sent, or with respect to time), and/or (iii) jitter in a signal (i.e., the deviation from true periodicity of a periodic signal). Further, the network path measurements may indicate which network path was used for the call, such as by using traceroute techniques. In some examples, the network expansion module 210 may analyze a plurality of network path measurement(s) 216 and determine, based on the network performance metrics, the total network performance for all network paths included in the network path measurement(s) 216. For example, higher round trip time, higher data loss rates, and higher jitter in a particular network path may lower an overall network performance score for the particular network path, whereas lower round trip time, lower data loss rates, and lower jitter in signals may raise the overall network performance score for the particular network path. Thus, in this example, the lower the network performance value, the better the network path is performing. Identifiers associated with the known network paths may be stored in the computer-readable media, such as in network path(s) 218 data store. The network expansion module 210 may associate the network performance data with the network path(s) 218. In various examples, the network expansion module 210 may update the network performance data for the network path(s) 218 as new call records for recently made calls are received from source computing devices and/or destination computing devices.

In some examples, the network expansion module 210 may further be configured to identify additional network paths which are not identified in the network path measurement(s) 216. For example, by analyzing the network path measurement(s) 216, network performance data for network paths(s) 218 that were actually used in previous calls or actively measured may be known. However, additional network paths that are available, but for which no network path measurement(s) have been obtained, may be determined by network expansion module 210. In some examples, determining the additional network paths may include determining, based on the network path measurement(s) 216, one or more network models that represent the one or more networks used to communicate the voice calls. By combining end-to-end measurements across several, partially overlapping network paths for which network performance data is known, and based on the one or more network models, network performance data for unknown portions (i.e., "holes") in the one or more networks may be determined by identifying or estimating network performance data for each segment of the network model. Additional details regarding determining network performance data for the unknown portions of the one or more networks are described below with reference to FIGS. 5A and 5B. Once the network performance data is determined for the previously unknown portions of the one or more networks, network performance data for additional network path(s) 218 may be identified, and the additional network path(s) 218 may be combined with a first group of network paths to create a second group of network paths associated with network performance data.

In some examples, the prediction module 212 may include computer-readable instructions that, when executed by the processors(s) 202, perform various operations for predicting a group of top-k network path(s) 218. For example, prediction module 212 may identify which of network path(s) 218 have the best network performance based on the analysis performed by the network expansion module 208. The prediction module may narrow down the network path(s) 218 into a group of top-k options comprising the network path(s) 218 which have the highest network performance scores. In some examples, k may be statically defined, such as the top 5 options or top 10 options. In other examples, k may be dynamically determined based on the mean ($\mu_r$) and standard error of mean ($SEM_r$) for each relayed network path. For instance, the top-k options may include the minimal set of relayed network path(s) 218 such that the lower 95% confidence bound ($\mu_r - 1.96\ SEM_r$) of any relayed network path(s) 218 not in the top-k is higher than the upper 95% confidence bound ($\mu_r + 1.96\ SEM_r$) of any relayed network path(s) 218 in the top-k. Thus, because the lower the network performance value suggests that the network path is a better option, there may be a high degree of confidence that any relay option that is not included in the top-k is worse than any that is.

In various examples, the selection module 214 may include computer-readable instructions that, when executed by the processors(s) 202, perform various operations for selecting a network path from the network path(s) 218. In some examples, the selection module 214 may simply select the network path with the best network performance score out of the group of top-k network path options identified by the prediction module 212. In other examples, the selection module 214 may apply a multi-armed bandit algorithm to explore different network path options from the group of top-k network paths. In such examples, the multi-armed bandit algorithm may greedily explore other network paths in the top-k options other than the highest ranked option. The multi-armed bandit algorithm may identify other network paths in the group of top-k network paths based on various factors, such as confidence measures in the measurements contained in the network path measurements for a particular network path, insufficient information for a particular time of day, an overall cost factor associated with adding traffic onto the one or more networks, or other factors. By greedily exploring network path options in the group of top-k network paths, additional and more recent network path measurements may be obtained and analyzed for network paths that may not ordinarily, or as frequently, be selected for a voice call. In other examples, the selection module 214 may further explore the available network path(s) 218 by periodically (e.g., every 50 selections, every 100 selections, etc.) selecting at random a network path that is outside of the top-k options for a voice call. In this way, network path measurements for network paths that are not selected as often may be obtained to update the network performance data for those network paths. In some examples, once the selection module 214 has selected a network path for a call, the selection module 214 may output, via one or more network interfaces 220, the selected network path to a source computing device and/or destination computing device requesting a path for a voice call. In some examples, the selection module 214 may periodically (e.g., hourly, daily, etc.) output a list of network path(s) 218 for source-destination computing device pairs to select from. In this way, the selection module 214 need only determine optimal network paths periodically rather than for every request that is received.

The controller server 200 may further include the network interface(s) 220 (i.e., communication connections) to send and receive data over one or more networks. Network interface(s) 220 may include one or more network interface controllers (NICs) or other types of transceiver devices to send and receive communications over a network, such as wide area network(s) 112 and/or relayed networks formed by the data center(s) 108. For example, network interface(s) 200 may send indications of network paths for performing a voice call to source computing devices and/or destination computing devices. Additionally, the network interface(s) 200 may receive, from source computing devices and/or destination computing devices, network path measurements comprising information about a call performed by the particular source-destination pair.

The controller server 200 may additionally include one or more input/output (I/O) interfaces 222 to allow the controller server 200 to communicate with other devices such as input peripheral devices (e.g., a keyboard, a mouse, a pen, a game controller, a voice input device, a touch input device, a gestural input device, a tracking device, a mapping device, a visual content item camera, a depth sensor, a physiological sensor, and the like) and/or output peripheral devices (e.g., a display, a printer, audio speakers, a haptic output, and the like). In this way, users (i.e., administrators) of controller server 200 may interact with the controller server 200 to perform various operations, such as updating computer-readable instructions stored on the controller server 200.

Figure 3:
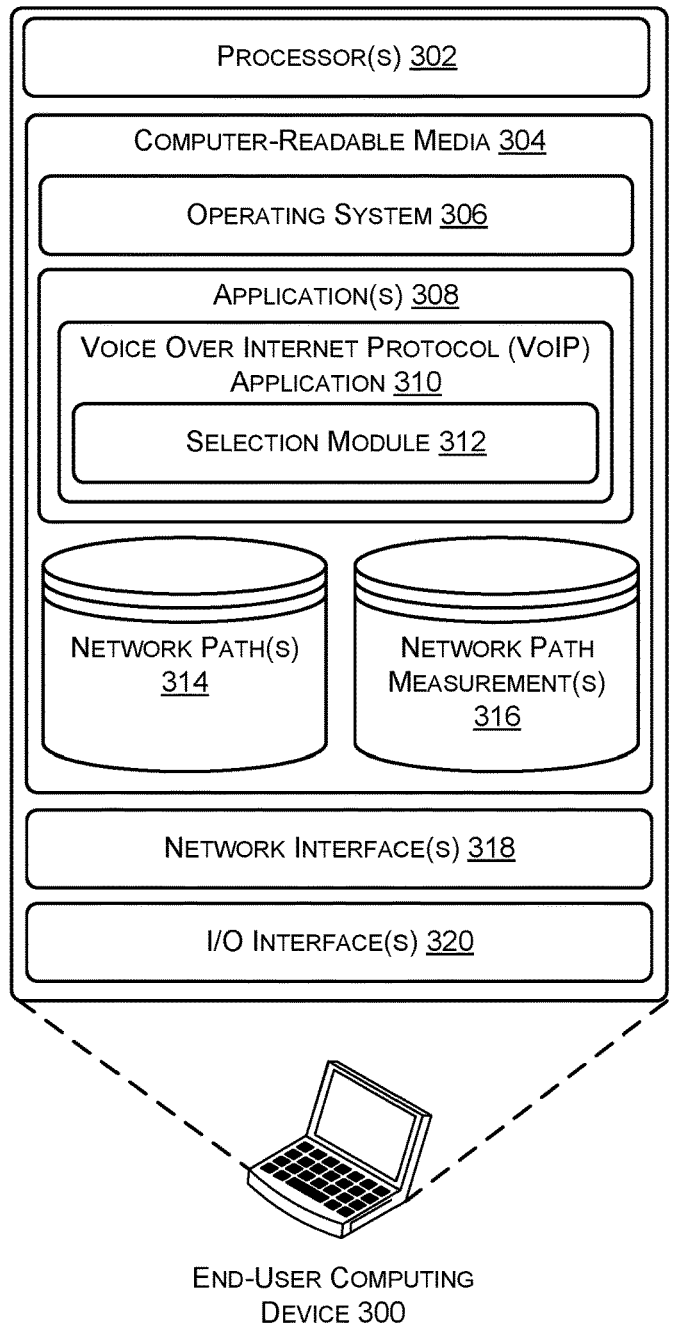
FIG. 3 is a schematic diagram showing an example end-user computing device to perform Internet voice calls.

FIG. 3 is a schematic diagram showing an example end-user computing device 300 to perform Internet voice calls. End-user computing device 300 may comprise any type of computing device, such as source computing device(s) 104 and destination computing device(s) 106. While illustrated as a portable laptop computing device, end-user computing device 300 may comprise any type of computing device configurable for performing voice communication calls, such as personal data assistants (PDAs), tablet computers or tablet hybrid computers, smartphones, mobile phones, or other telecommunication devices, portable or console-based gaming devices, automotive computers such as vehicle control systems, vehicle security systems, autonomous vehicles, or any other type of end-user computing device.

The end-user computing device 300 may include one or more processors 302 communicatively coupled to computer-readable media 304, such as by a communication bus. The processor(s) 302 may include a central processing unit (CPU), graphics processing unit (GPU), a microprocessor, and so on. Computer-readable media 304 may store an operating system 306 and one or more applications 308. The operating system 306 may include computer-readable instructions that manage hardware and software resources of the end-user computing device 300. The application(s) 308 may include one or more applications and modules for communicating voice calls using one or more networks, such as a voice over internet protocol (VoIP) application 310 (e.g., SKYE®, GOOGLE HANGOUTS®, etc.).

In some examples, VoIP application 310 may perform functionalities for performing voice calls over the Internet, such as communicating with a controller server (i.e., controller server(s) 102) to determine a network path, and sending and receiving data in a voice call with a destination end-user computing device 300. In various examples, the VoIP application 310 may further include a selection module 312. The selection module may include computer-readable instructions that, when executed by the processor(s) 302, select a network path from the network path(s) 314 for the end-user computing device 300 to use to perform a voice call. In some examples, the VoIP application 310 may receive a request from a user of the end-user computing device 300 to perform a voice call with a destination computing device. The VoIP application 310 may then send the request to a controller server. The controller server may then send an indication of a network path for the VoIP application 310 to use for a voice call. In other examples, the VoIP application 310 may periodically (e.g., hourly, daily, etc.) receive a list of network path(s) 314 that the selection module 312 may select from. For instance, the selection module 312 may receive a list of network path(s) 314 from a controller server that the selection module 312 may choose from. The selection module 312 may select a network path from any in the list of network path(s) 314 using methods similar to those described with respect to selection module 214. For instance, the selection module 312 may identify a group of top-k candidates in the network path(s) 314 based on network performance data determined for the network path(s) 314, and may (i) select the top candidate based on network performance, (ii) apply a multi-armed bandit algorithm to the top-k candidates to greedily explore-exploit a network path, or (iii) select a network path at random from the network path(s) 314 that are not in the top-k options.

In various examples, the VoIP application 312 may store network path measurement(s) 316 from calls performed by the end-user computing device 300 with other computing devices and/or of actively obtained measurements. The VoIP application 310 may then send the network path measurement(s) 316, either after each call or periodically (e.g., twice a day, once a day, etc.) in a bunch, to a controller server. In this way, the controller server may determine network performance data for the network paths to adjust for changes in network performance data over time.

The end-user computing device 300 may further include one or more network interfaces 318 (i.e., communication connections) to send and receive data over one or more networks. Network interface(s) 318 may include one or more network interface controllers (NICs) or other types of transceiver devices to send and receive communications over a network, such as wide area network(s) 112 and/or relayed networks formed by the data center(s) 108. For example, network interface(s) 318 may send requests for a network path to a controller server, send network path measurement(s) 316 to a controller server, perform voice calls over one or more networks, and receive a list of network path(s) 314 from a controller server.

The end-user computing device 300 may additionally include one or more input/output (I/O) interfaces 320 to allow the end-user computing device 300 to communicate with other devices such as input peripheral devices (e.g., a keyboard, a mouse, a pen, a game controller, a voice input device, a touch input device, a gestural input device, a tracking device, a mapping device, a visual content item camera, a depth sensor, a physiological sensor, and the like) and/or output peripheral devices (e.g., a display, a printer, audio speakers, a haptic output, and the like). In this way, users of end-user computing device 300 may interact with the end-user computing device 300 to perform various operations, such as performing voice calls using the VoIP application 310.

The computer-readable media 204 and 304 can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media.

In some examples, processor(s) 202 and 302 can represent, for example, a CPU-type processing unit, a GPU-type processing unit, a HPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In various examples, the processor(s) 202 and 302 can execute one or more modules and/or processes to cause the controller server 200 and end-user computing device 300 to perform operations for data-driven selection of network paths and performing voice calls. Additionally, each of the processor(s) 202 and 302 may possess their own local memory, which also may store program modules, program data, and/or one or more operating systems.

Example Diagrams

Figure 4:
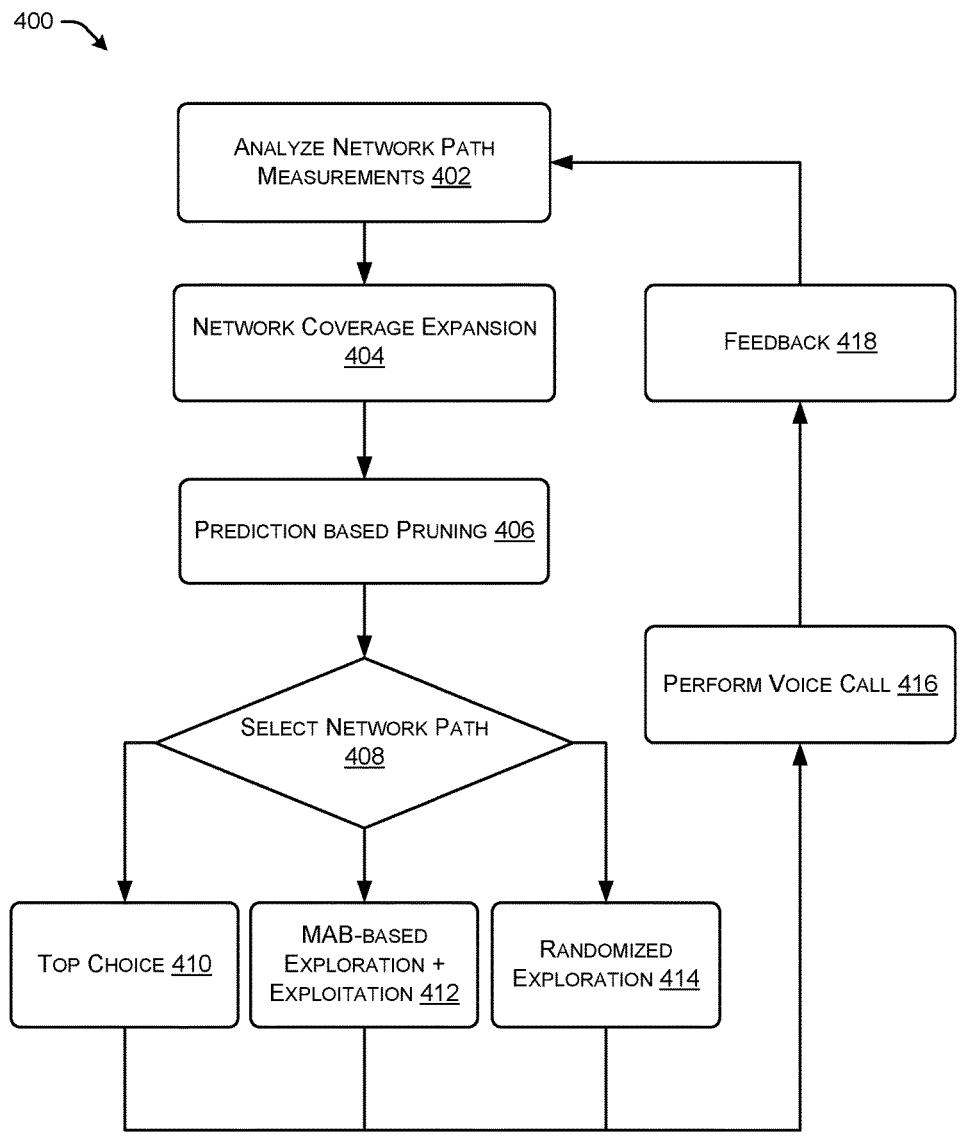
FIG. 4 is a flow diagram showing an example process to identify a network path for an Internet voice call and provide network performance feedback for the identified network path.

FIG. 4 is a flow diagram showing an example process 400 to identify a network path for an Internet voice call and provide network performance feedback for the identified network path. The operations of process 400 may be performed by modules of one or more computing devices, such as the controller server 200 and/or the end-user computing device 300.

At block 402, the network expansion module 210 may analyze previous network path measurements to determine network performance data for various network paths used to communicate Internet voice calls. The previous voice network path measurements may be analyzed based on one or more factors or metrics indicating network performance, such as the round trip time for the voice call, a rate at which data packets are lost with respect to time or a total amount of data, and/or a measure of jitter in a signal. One or all of these network performance metrics may be analyzed and determined for an entire call of a call record. One or all of the network performance metrics may be combined in any manner (i.e., normalized and combined) to determine a total network performance for particular network paths. In some examples, one or more predefined thresholds may be determined or identified for each of the metrics, and/or for the total network performance.

At block 404, the network expansion module 210 may expand the network coverage by determining network performance data for additional network paths. The network expansion module 210 may determine a network tomography for networks between one or more source-destination pairs. For instance, the network expansion module 210 may determine the internal characteristics of the one or more networks using information derived from end-point data contained in the call records. Based on the end-to-end measurements between the source-destination pairs, internal characteristics of the one or more networks may be identified. For example, the one or more networks internal characteristics may be determined, such as by using traceroutes, such that the one or more networks may be modeled using one of, or a combination of, network models (e.g., star model, mesh model, etc.). Once the network has been suitably modeled, the additional network paths may be determined based on the network model or models and the network performance data for the first plurality of network paths. For example, as discussed in more detail in FIG. 5, multiple network paths from the first plurality of paths that partially overlap may be used to determine network performance data for missing portions of the second plurality of network paths. In this way, network performance data for a second plurality of network paths, which includes the additional network paths and the first plurality of network paths, may be determined and expand the coverage and available options for relaying a call based on network performance data.

At block 406, the prediction module 212 may perform data-driven prediction based pruning of the network paths to identify top-k options to use for communicating a call between a source-destination pair. Using the network performance data determined for the network paths, the controller server may identify a group of the top options, or the options with the best historical network performance data. The network performance data may be determined using one or more of the network performance factors, and the top-k options (i.e., top 5, top 10, etc.) may be identified based on their network performance data.

At block 408, one of the selection modules 214 or 312 may select a network path for use by a source-destination pair. For instance, one of the selection modules 214 or 312 may simply identify the top network path from the top-k options and output an indication to a source computing device to use that particular network path. In some examples, one of the selection modules 214 or 312 may include a multi-armed bandit algorithm and apply the multi-armed bandit algorithm to the top-k options. The network paths included in the top-k options may each be considered an "arm" of the bandit where the network performance obtained is the reward. The multi-armed bandit algorithm may greedily explore the options in the top-k group and exploit the best decision based on various factors, such as the confidence in the measurements used for determining the network performance data of the network paths, the particular time of day, or any other factors. In some examples, one of the selection modules 214 or 312 may select the network path at random from the network paths outside of the top-k options. By selecting a random network path outside of the top-k options, additional data for network paths that may not otherwise be explored is obtained and the network path performance is updated.

In some examples, selecting the network path at block 408 may take into account budgeting factors. For example, the selection modules 214 or 312 may take into account various benefits and costs associated with using certain network paths. As an example, using a relayed path (i.e., a path through one or more relays positioned at data center(s) may benefit a voice call (i.e., better performance), but there may be costs, such as placing too much load on the network of relays, which result in the relayed path not being the best selection based on overall cost. In some examples, thresholds for a minimum call performance increase may be set, such as the call benefits predicted using a relayed path must be higher than a 5% increase in call performance compared to the direct path (i.e., public Internet path). If the benefits for the call performance is not greater than a 5% performance increase, the relayed path may not be selected. In some examples, threshold percentages for an amount of calls sent through the relayed networks may be set. For example, a percentage threshold of voice calls (e.g., 10%, 20%, etc.) that are allowed to be sent through relayed paths may be determined for the total number of voice calls being made. Thus, in some examples only a certain percentage of calls are sent through the relayed network option, such as the 20% of calls who experience the most improved network performance using the relayed paths. In some examples, thresholds of calls may be set for particular relays as well to keep the load balanced. Thus, in various examples selecting between one or more relayed network paths and direct network paths (i.e., wide area networks) may be based on overall cost benefits, such as total network load for a relayed network, total load for individual relays, etc.

At blocks 410, 412, or 414, at least one of the selection module 214 or the selection module 312 may select a network path by selecting the top choice candidate from the top-k options (410), by selecting a network path from the top-k options using a multi-armed bandit algorithm (412), or by selecting a network path for randomized exploration (414).

At block 416, the source computing device(s) 104 and/or destination computing device(s) 106 may receive the selected network path and perform a voice call using the selected network path.

At block 418, one or both of the source computing device(s) 104 and/or destination computing device(s) 106 may provide feedback to the controller server. For instance, one or both of the source computing device(s) 104 and/or destination computing device(s) 106 may send a call record including information about the call and the network performance metrics to the controller server to be analyzed at block 402.

FIGS. 5A and 5B are schematic diagrams 500 and 502 of example network path coverage expansion techniques for determining network performance data for network paths that do not have previous network path measurements. The techniques described herein may be performed by one or more modules, such as the network expansion module 210.

As shown in FIG. 5A, diagram 500 depicts a portion of a network with nodes A, B, C, and D. In some examples, the nodes may include computing devices in a network (i.e., relays, servers, data centers, etc.) and end-point computing devices for performing voice calls (i.e., source computing devices, destination computing devices, etc.). As shown in diagram 500, network performance data (i.e., time for a signal to traverse a segment) may be known based on network path measurements for certain segments of the portion of the network. As illustrated, network performance data may be known for segments A→C, A→D, and B→D. As further illustrated, using these known network performance data for the segments, network performance data for segments of the portion of the network may be determined. For example, it may be determined that, as shown in Calculation 504, the total time to traverse segment A→B is 3 ms. Once network performance data for segment A→B are known, it may further be determined that, as shown in Calculation 506, the total time to traverse segment B→C is 2 ms.

As shown in FIG. 5B, diagram 502 depicts a portion of a network with nodes A, B, C, D, and a relay node RN. Similar to diagram 500, diagram 502 depicts a portion of a network that is modeled as a star network. Network performance data may be known based on network path measurements for certain segments of the portion of the network, such as segments A→B, B→C, and A→D. Using these known network performance data, as shown in calculation 508, network performance data for the missing segment C→D may be determined.

Thus, FIGS. 5A and 5B illustrate how to use network performance values obtained from network path measurements for known segments of a network to determine missing network performance data for portions, or "holes," of the network. Using these and other similar techniques, the network expansion module 210 may expand the network path options with known or estimated network performance data to provide a larger selection of network paths for data-driven selection of network paths for voice calls. Although the illustrated techniques are performed with respect to time for a signal to traverse a portion of a network, the techniques may be applied to determine other missing network performance metrics, such as jitter and data loss. For instance, by observing total data flow rates for various portions of a network, it can be determined how much data is lost for segments of a network that do not have network path measurement information.

Example Processes

The processes described in FIGS. 6-8 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes described below may be performed by modules stored on one or more of controller server 200 and/or end-user computing device 300, such as network expansion module 210, prediction module 212, selection module 214, and/or selection module 312.

Figure 6:
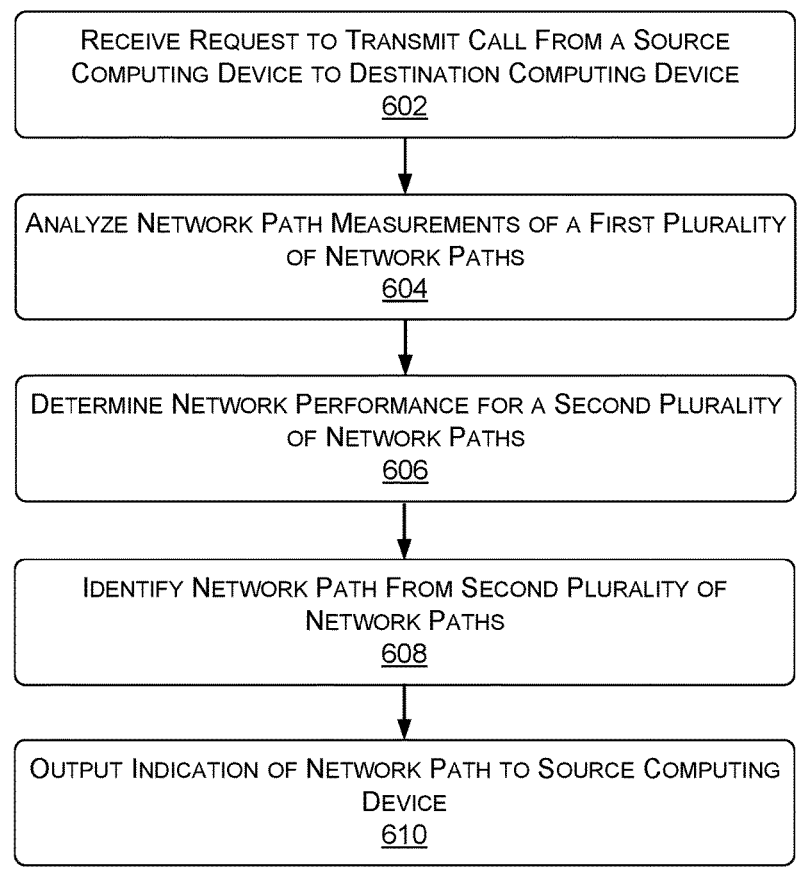
FIG. 6 is a flow diagram showing an example process for analyzing network path measurements to expand the coverage of network path options, and identifying a network path from the network path options to be used for a voice call.

FIG. 6 is a flow diagram showing an example process for analyzing network path measurements to determine a network path to be used for a voice call.

At block 602, the controller server 200 may receive, from a source computing device via network interface(s) 220 and over one or more networks, a request to transmit a call from the source computing device to a destination computing device.

At block 604, the network expansion module 210 may analyze, based at least in part on one or more network performance factors, network path measurements of calls made using a first group of network paths through one or more networks and between the source computing device and the destination computing device to determine network performance data for the first group of network paths. In some examples, the one or more network performance factors may comprise at least one of an amount of time for a signal to be sent, using a particular network path, from a first computing device to a second computing device plus an amount of time for an acknowledgment of the signal to be sent, using the particular network path, from the second computing device to the first computing device, a rate at which packets of a signal traversing a particular network path are lost with respect to at least one of time or an amount of packets sent in the signal, or a measure of jitter in a signal caused by traversing a particular network path.

At block 606, the prediction module 212 may determine, based at least in part on the network performance data for the first plurality of network paths, network performance data for a second plurality of network paths, the second plurality of network paths including the first plurality of network paths. In some examples, determining the network performance data for the second plurality of network paths may include selecting, based at least in part on the first plurality of network paths, one or more network models to model the one or more networks; identifying, based at least in part on the one or more network models and the network path measurements, segment specific network performance data for segments of the first plurality of network paths; determining, based at least in part on the one or more network models and the segments, additional network paths through the one or more networks; and determining additional network performance data for the additional network paths.

At block 608, the selection module 214 may identify, based at least in part on the network performance data, a network path from the second plurality of network paths to use for transmitting the call. In some examples, identifying the network path from the second plurality of network paths includes identifying a group of network paths from the second plurality of network paths based at least in part on respective network performance data for each network path in the group of network paths relative to other network paths in the second plurality of network paths; and selecting the network path from the group of network paths based at least in part on the network path having a highest network performance in the group of network paths. In various examples, identifying the network path from the second plurality of network paths comprises: identifying a group of network paths from the second plurality of network paths based at least in part on respective network performance data for each network path in the group of network paths relative to other network paths in the second plurality of network paths; and selecting the network path from the group of network paths by applying a multi-armed bandit algorithm to the group of network paths. In some examples, identifying the network path from the second plurality of network paths comprises: identifying a group of network paths from the second plurality of network paths based at least in part on respective network performance data for each network path in the group of network paths relative to other network paths in the second plurality of network paths; and selecting the network path randomly from the other network paths in the second plurality of network paths.

At block 610, the controller server 200 may output, using the network interface(s) 220, an indication of the network path identified for transmitting the call to the source computing device. In some examples, outputting the indication of the network path may comprise outputting a plurality of network paths usable to transmit the call.

Figure 7:
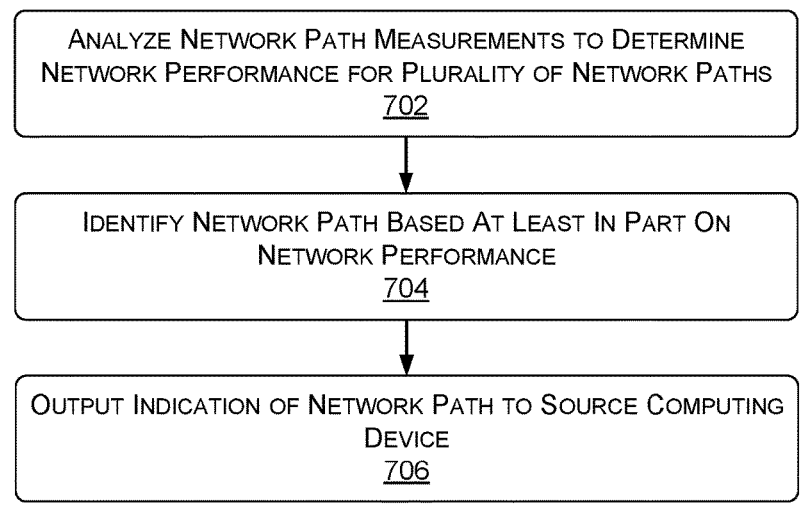
FIG. 7 is a flow diagram showing an example process for analyzing network path measurements to determine a network path to be used for a voice call.

FIG. 7 is a flow diagram showing an example process 700 for analyzing network path measurements to determine a network path to be used for a voice call.

At block 702, the network expansion module 210 may analyze, based at least in part on one or more network performance factors, records of voice communications made using a first plurality of network paths through one or more networks for a particular source-destination pair to determine network performance data for the first plurality of network paths. In some examples, analyzing records of voice communications comprises: identifying a source computing device and a destination computing device of the source-destination pair; and identifying the first plurality of network paths based at least in part on the first plurality of network paths traversing a route between the source computing device and the destination computing device of the source-destination pair.

At block 704, the selection module 214 may identify a network path from the first plurality of network paths or a second plurality of network paths based at least in part on a network performance of the network path relative to the network performance data of the first plurality of network paths and network performance data for the second plurality of network paths. In some examples, the one or more network performance factors comprise at least one of: an amount of time for a signal to be sent, using a particular network path, from a source computing device to a destination computing device of the source-destination pair plus an amount of time for an acknowledgment of the signal to be sent, using the particular network path, from the destination computing device to the source computing device; a rate at which packets of a signal traversing a particular network path are lost with respect to at least one of time or an amount of packets sent in the signal; or a measure of jitter in a signal caused by traversing a particular network path.

At block 706, the controller server 200 may output, via network interface(s) 220, an indication of the network path to a computing device.

Figure 8:
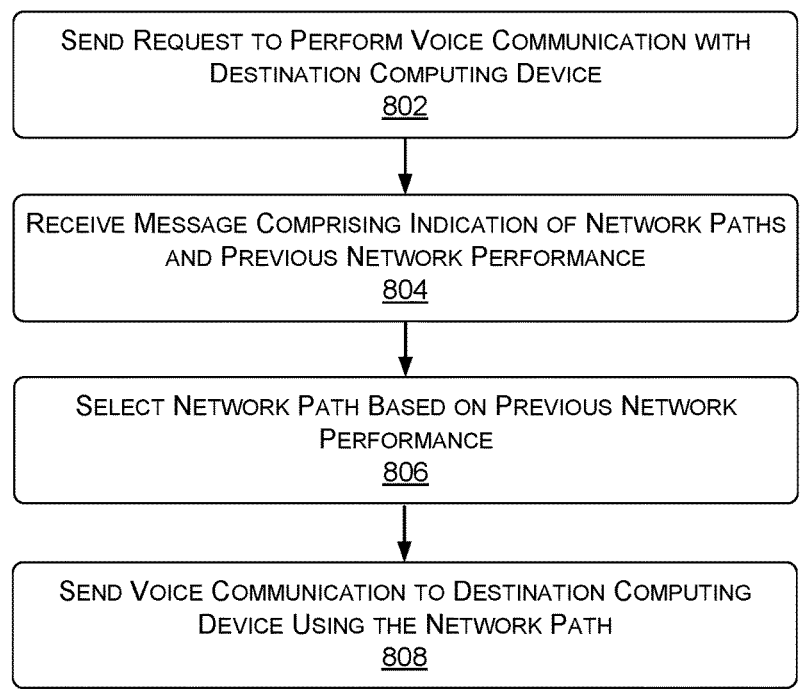
FIG. 8 is a flow diagram showing an example process for sending a request to perform a voice call, receiving an indication of network paths to perform the voice call, and selecting a network path for performing the voice call.

FIG. 8 is a flow diagram showing an example process for sending a request to perform a voice call, receiving an indication of network paths to perform the voice call, and selecting a network path for performing the voice call.

At block 802, a request may be sent, via network interface(s) 318 and to a controller server 200, to perform voice communication with a destination computing device via one or more networks.

At block 804, a message may be received, from the controller server, comprising an indication of one or more network paths between the computing device and the destination computing device and through the one or more networks, the message further comprising previous network performance data associated with each of the one or more network paths. In some examples, the message further comprises a suggested order to choose from the one or more network paths for performing the voice communication; and selecting the network path from the one or more network paths is based at least in part on the suggested order.

At block 806, a network path may be selected, by one or more processors, from the one or more network paths based at least in part on a respective previous network performance of the network path. In some examples, selecting the network path from the one or more network paths comprises identifying a group of network paths from the one or more network paths based at least in part on the previous network performance data of the group of network paths being higher than the previous network performance data for others of the one or more network paths; and selecting the network path from the group of network paths based at least in part on the network path having a best previous network performance in the group of network paths.

At block 808, a voice communication may be sent using the network interface(s) 318 to the destination computing device using the network path.

Example Clauses

A. A system comprising: one or more processors; and memory communicatively coupled to the one or more processors and storing one or more modules that, when executed by the one or more processors, cause the client computing device to perform operations comprising: receiving, from a source computing device, a request to transmit, via one or more networks, a call from the source computing device to a destination computing device; analyzing, based at least in part on one or more network performance factors, network path measurements for a first plurality of network paths through one or more networks and between the source computing device and the destination computing device to determine network performance data for the first plurality of network paths; determining, based at least in part on the network performance data for the first plurality of network paths, network performance data for a second plurality of network paths, the second plurality of network paths including the first plurality of network paths; identifying, based at least in part on the network performance data, a network path from the second plurality of network paths to use for transmitting the call; and outputting, to the source computing device, an indication of the network path identified for transmitting the call.

B. A system as paragraph A recites, wherein the one or more network performance factors comprise at least one of: round trip time using a particular network path; data loss for a particular network path; or a measure of jitter in a signal caused by traversing a particular network path.

C. A system as paragraph A or B recite, wherein determining the network performance data for the second plurality of network paths comprises: selecting, based at least in part on the first plurality of network paths, one or more network models to model the one or more networks; identifying, based at least in part on the one or more network models and the network path measurements, segment specific network performance data for segments of the first plurality of network paths; determining, based at least in part on the one or more network models and the segments, additional network paths through the one or more networks; and determining additional network performance data for the additional network paths.

D. A system as any of paragraphs A-C recite, wherein identifying the network path from the second plurality of network paths comprises: identifying a group of network paths from the second plurality of network paths based at least in part on respective network performance data for each network path in the group of network paths relative to other network paths in the second plurality of network paths; and selecting the network path from the group of network paths based at least in part on the network path having a highest network performance in the group of network paths.

E. A system as any of paragraphs A-C recite, wherein identifying the network path from the second plurality of network paths comprises: identifying a group of network paths from the second plurality of network paths based at least in part on respective network performance data for each network path in the group of network paths relative to other network paths in the second plurality of network paths; and selecting the network path from the group of network paths by applying a multi-armed bandit algorithm to the group of network paths.

F. A system as any of paragraphs A-C recite, wherein identifying the network path from the second plurality of network paths comprises: identifying a group of network paths from the second plurality of network paths based at least in part on respective network performance data for each network path in the group of network paths relative to other network paths in the second plurality of network paths; and selecting the network path randomly from the other network paths in the second plurality of network paths.

G. One or more computer-storage media storing computer-executable instructions that, when executed by one or more processors, configure the one or more processors to perform operations comprising: analyzing, based at least in part on one or more network performance factors, records of voice communications made using a first plurality of network paths through one or more networks for a particular source-destination pair to determine network performance data for the first plurality of network paths; identifying a network path from the first plurality of network paths or a second plurality of network paths based at least in part on network performance data of the network path relative to the network performance data of the first plurality of network paths and network performance data for the second plurality of network paths; outputting an indication of the network path to a computing device.

H. One or more computer-storage media as paragraph G recites, the operations further comprising: identifying, based at least in part on the network performance data for the first plurality of network paths, segment specific network performance data for segments of the first plurality of network paths; selecting, based at least in part on the first plurality of network paths, one or more network models to model the one or more networks for the particular source-destination pair; and determining, based at least in part on the one or more models and the segment specific network performance data for the segments of the first plurality of network paths, network performance data for the second plurality of network paths.

I. One or more computer-storage media as paragraph G or H recite, wherein identifying the network path comprises: identifying a group of network paths from at least one of the first plurality of network paths or the second plurality of network paths based at least in part on respective network performance data for each network path in the group of network paths relative to network performance data of other network paths in the first plurality of network paths and the second plurality of network paths; and selecting the network path from the group of network paths based at least in part on the network path having a highest network performance in the group of network paths.

J. One or more computer-storage media as paragraph G or H recite, wherein identifying the network path comprises: identifying a group of network paths from at least one of the first plurality of network paths or the second plurality of network paths based at least in part on respective network performance data for each network path in the group of network paths relative to network performance data of other network paths in the first plurality of network paths and the second plurality of network paths; and selecting the network path from the group of network paths by applying a multi-armed bandit algorithm to the group of network paths.

K. One or more computer-storage media as paragraph G or H recite, wherein identifying the network path comprises: identifying a group of network paths from at least one of the first plurality of network paths or the second plurality of network paths based at least in part on respective network performance data for each network path in the group of network paths relative to network performance data of other network paths in the first plurality of network paths and the second plurality of network paths; and selecting the network path randomly from the other network paths in the first plurality of network paths and the second plurality of network paths.

L. One or more computer-storage media as any of paragraphs G-K recite, wherein the one or more network performance factors comprise at least one of: an amount of time for a signal to be sent, using a particular network path, from a source computing device to a destination computing device of the source-destination pair plus an amount of time for an acknowledgment of the signal to be sent, using the particular network path, from the destination computing device to the source computing device; a rate at which packets of a signal traversing a particular network path are lost with respect to at least one of time or an amount of packets sent in the signal; or a measure of jitter in a signal caused by traversing a particular network path.

M. One or more computer-storage media as any of paragraphs G-L recite, wherein analyzing records of voice communications comprises: identifying a source computing device and a destination computing device of the source-destination pair; and identifying the first plurality of network paths based at least in part on the first plurality of network paths traversing a route between the source computing device and the destination computing device of the source-destination pair.

N. One or more computer-storage media as any of paragraphs G-M recite, wherein identifying the network path from the first plurality of network paths or the second plurality of network paths comprises: determining a first number of voice communications being relayed through a first network of the one or more networks, the first network comprising one or more relays; determining whether the first number of voice communications exceeds a predefined cost threshold associated with the first network; and in response to determining that the first number of voice communications does not exceed the predefined cost threshold, selecting the network path, the network path comprising a communication path through the first network.

O. A computer-implemented method comprising: sending, via one or more network interfaces and to a controller server, a request to perform voice communication with a destination computing device via one or more networks; receiving, from the controller server and via the one or more network interfaces, a message comprising an indication of one or more network paths between the computing device and the destination computing device and through the one or more networks, the message further comprising previous network performance data associated with each of the one or more network paths; selecting, by one or more processors, a network path from the one or more network paths based at least in part on a respective previous network performance of the network path; and sending, via the one or more network interfaces, a voice communication to the destination computing device using the network path.

P. A computer-implemented method as paragraph O recites, wherein the message further comprises a suggested order to choose from the one or more network paths for performing the voice communication; and wherein selecting the network path from the one or more network paths is based at least in part on the suggested order.

Q. A computer-implemented method as paragraph O or P recite, wherein selecting the network path from the one or more network paths comprises: identifying a group of network paths from the one or more network paths based at least in part on the previous network performance data of the group of network paths being higher than the previous network performance data for others of the one or more network paths; and selecting the network path from the group of network paths based at least in part on the network path having a best previous network performance in the group of network paths.

R. A computer-implemented method as any of paragraph O or P recite, wherein selecting the network path from the one or more network paths comprises: identifying a group of network paths from the one or more network paths based at least in part on the previous network performance data of the group of network paths being higher than the previous network performance data for others of the one or more network paths; and selecting the network path from the group of network paths by applying a multi-armed bandit algorithm to the group of network paths.

S. A computer-implemented method as paragraph O or P recite, wherein selecting the network path from the one or more network paths comprises: identifying a group of network paths from the one or more network paths based at least in part on the previous network performance data of the group of network paths being higher than the previous network performance data for the remaining network paths of the one or more network paths; and selecting the network path randomly from the remaining network paths.

T. A computer-implemented method as any of paragraphs O-S recite, the operations further comprising sending a record of the voice communication performed using the network path to the controller server, the record including network performance information.

U. One or more computer-readable media encoded with instructions that, when executed by a processor, configure a computer to perform a computer-implemented method as any of paragraphs O-T recite.

V. A device comprising one or more processors and one or more computer-readable media encoded with instructions that, when executed by the one or more processors, configure a computer to perform a computer-implemented method as any of paragraphs O-T recite.

W. A computer-implemented method comprising: means for sending, via one or more network interfaces and to a controller server, a request to perform voice communication with a destination computing device via one or more networks; means for receiving, from the controller server and via the one or more network interfaces, a message comprising an indication of one or more network paths between the computing device and the destination computing device and through the one or more networks, the message further comprising previous network performance data associated with each of the one or more network paths; means for selecting, by one or more processors, a network path from the one or more network paths based at least in part on a respective previous network performance of the network path; and means for sending, via the one or more network interfaces, a voice communication to the destination computing device using the network path.

X. A computer-implemented method as paragraph W recites, wherein the message further comprises a suggested order to choose from the one or more network paths for performing the voice communication; and wherein selecting the network path from the one or more network paths is based at least in part on the suggested order.

Y. A computer-implemented method as paragraph W or X recite, wherein selecting the network path from the one or more network paths comprises: means for identifying a group of network paths from the one or more network paths based at least in part on the previous network performance data of the group of network paths being higher than the previous network performance data for others of the one or more network paths; and means for selecting the network path from the group of network paths based at least in part on the network path having a best previous network performance in the group of network paths.

Z. A computer-implemented method as any of paragraph W or X recite, wherein selecting the network path from the one or more network paths comprises: means for identifying a group of network paths from the one or more network paths based at least in part on the previous network performance data of the group of network paths being higher than the previous network performance data for others of the one or more network paths; and means for selecting the network path from the group of network paths by applying a multi-armed bandit algorithm to the group of network paths.

AA. A computer-implemented method as paragraph W or X recite, wherein selecting the network path from the one or more network paths comprises: means for identifying a group of network paths from the one or more network paths based at least in part on the previous network performance data of the group of network paths being higher than the previous network performance data for the remaining network paths of the one or more network paths; and means for selecting the network path randomly from the remaining network paths.

AB. A computer-implemented method as any of paragraphs W-AB recite, the operations further comprising means for sending a record of the voice communication performed using the network path to the controller server, the record including network performance information.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A system comprising: one or more processors; and memory communicatively coupled to the one or more processors and storing one or more modules that, when executed by the one or more processors, cause the system to perform operations comprising:
   receiving, from a source computing device, a request to transmit, via one or more networks, a call from the source computing device to a destination computing device;
   analyzing, based at least in part on one or more network performance factors, network path measurements for a first plurality of network paths through one or more networks and between the source computing device and the destination computing device to determine network performance data for the first plurality of network paths;
   determining, based at least in part on the network performance data for the first plurality of network paths, network performance data for a second plurality of network paths, the second plurality of network paths including the first plurality of network paths and additional network paths;
   identifying a group of network paths from the second plurality of network paths based at least in part on respective network performance data for each network path in the group of network paths relative to other network paths in the second plurality of network paths, the group of network paths including higher network performance than a predetermined threshold;
   selecting a network path from the other network paths that have network performance data lower than the predetermined threshold in the second plurality of network paths; and outputting, to the source computing device, an indication of the network path identified for transmitting the call.

2. The system of claim 1, wherein the one or more network performance factors comprise at least two of:
   round trip time using a particular network path;
   data loss for a particular network path; or
   a measure of jitter in a signal caused by traversing a particular network path.

3. The system of claim 1, wherein determining the network performance data for the second plurality of network paths comprises:
   selecting, based at least in part on the first plurality of network paths, one or more network models to model the one or more networks;
   identifying, based at least in part on the one or more network models and the network path measurements, segment specific network performance data for segments of the first plurality of network paths, the segments including only a portion of a network path of the first plurality of network paths;
   determining, based at least in part on the one or more network models and the segments, additional network paths through the one or more networks by combining multiple segments of the segments to create each additional network path of the additional network paths; and
   determining additional network performance data for the additional network paths by combining the segment specific network performance data of each corresponding segment of the combined multiple segments.

4. The system of claim 1, wherein identifying the network path from the second plurality of network paths comprises:
   selecting the network path from the group of network paths by applying a multi-armed bandit algorithm to the group of network paths.

5. The system of claim 1, wherein identifying the network path from the second plurality of network paths comprises:
   selecting the network path randomly from the other network paths in the second plurality of network paths.

6. One or more non-transitory computer-storage media storing computer-executable instructions that, when executed by one or more processors, configure the one or more processors to perform operations comprising: analyzing, based at least in part on one or more network performance factors, records of voice communications made using a first plurality of network paths through one or more networks for a particular source-destination pair to determine network performance data for the first plurality of network paths; determining, based at least in part on the network performance data for the first plurality of network paths, network performance data for a second plurality of network paths, the second plurality of network paths including the first plurality of network paths and additional network paths: identifying a group of network paths from the second plurality of network paths based at least in part on respective network performance data for each network path in the group of network paths relative to other network paths in the second plurality of network paths, the group of network paths including higher network performance than a predetermined threshold; selecting a network path from the other network paths that have network performance data lower than the predetermined threshold in the second plurality of network paths; and outputting an indication of the selected network path to a computing device.

7. The one or more non-transitory computer-storage media of claim 6, the operations further comprising:
 identifying, based at least in part on the network performance data for the first plurality of network paths, segment specific network performance data for segments of the first plurality of network paths;
 selecting, based at least in part on the first plurality of network paths, one or more network models to model the one or more networks for the particular source-destination pair; and
 determining, based at least in part on the one or more models and the segment specific network performance data for the segments of the first plurality of network paths, network performance data for the second plurality of network paths.

8. The one or more non-transitory computer-storage media of claim 6, wherein identifying the network path comprises:
 selecting the network path from the group of network paths by applying a multi-armed bandit algorithm to the group of network paths.

9. The one or more computer-storage media of claim 6, wherein identifying the network path comprises:
 selecting the network path randomly from the other network paths in the first plurality of network paths and the second plurality of network paths.

10. The one or more non-transitory computer-storage media of claim 6, wherein the one or more network performance factors comprise at least two of:
 an amount of time for a signal to be sent, using a particular network path, from a source computing device to a destination computing device of the source-destination pair plus an amount of time for an acknowledgment of the signal to be sent, using the particular network path, from the destination computing device to the source computing device;
 a rate at which packets of a signal traversing a particular network path are lost with respect to at least one of time or an amount of packets sent in the signal; or
 a measure of jitter in a signal caused by traversing a particular network path.

11. The one or more non-transitory computer-storage media of claim 6, wherein analyzing records of voice communications comprises:
 identifying a source computing device and a destination computing device of the source-destination pair; and
 identifying the first plurality of network paths based at least in part on the first plurality of network paths traversing a route between the source computing device and the destination computing device of the source-destination pair.

12. The one or more non-transitory computer-storage media of claim 6, wherein identifying the network path from the first plurality of network paths or the second plurality of network paths comprises:
 determining a first number of voice communications being relayed through a first network of the one or more networks, the first network comprising one or more relays;
 determining whether the first number of voice communications exceeds a predefined cost threshold associated with the first network; and
 in response to determining that the first number of voice communications does not exceed the predefined cost threshold, selecting the network path, the network path comprising a communication path through the first network.

13. A computer-implemented method comprising: sending, via one or more network interfaces and to a controller server, a request to perform voice communication with a destination computing device via one or more networks; receiving, from the controller server and via the one or more network interfaces, a message comprising an indication of one or more network paths between the computing device and the destination computing device and through the one or more networks, the message further comprising previous network performance data associated with each of the one or more network paths, the previous network performance data indicating that first network paths of the one or more network paths include higher network performance than a predetermined threshold; selecting, by one or more processors, a network path from the other network paths that have network performance data lower than the predetermined threshold; and sending, via the one or more network interfaces, a voice communication to the destination computing device using the selected network path.

14. The computer-implemented method of claim 13, wherein the message further comprises a suggested order to choose from the one or more network paths for performing the voice communication; and
 wherein selecting the network path from the other network paths is based at least in part on the suggested order.

15. The computer-implemented method of claim 13, wherein selecting the network path from the one or more network paths comprises:
 selecting the network path from the group of network paths by applying a multi-armed bandit algorithm to the group of network paths.

16. The computer-implemented method of claim 13, wherein selecting the network path from the one or more network paths comprises:
 selecting the network path randomly from the remaining network paths.

17. The computer-implemented method of claim 13, the operations further comprising sending a record of the voice communication performed using the network path to the controller server, the record including network performance information.

* * * * *